United States Patent
Rorro et al.

(10) Patent No.: US 11,544,658 B2
(45) Date of Patent: Jan. 3, 2023

(54) PLATFORM USING INSTRUCTION ENGINE TO SIMULATE AND PERFORM WAREHOUSE PROCESSES

(71) Applicant: Target Brands, Inc., Minneapolis, MN (US)

(72) Inventors: Michael Rorro, Minneapolis, MN (US); Tikhon Jelvis, Minneapolis, MN (US); Bryce Cooks, Minneapolis, MN (US); Kaveh Khodjasteh Lakelayeh, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/806,699

(22) Filed: Mar. 2, 2020

(65) Prior Publication Data
US 2020/0334619 A1 Oct. 22, 2020

Related U.S. Application Data

(60) Provisional application No. 62/835,961, filed on Apr. 18, 2019.

(51) Int. Cl.
*G06Q 30/00* (2012.01)
*G06Q 10/06* (2012.01)
(Continued)

(52) U.S. Cl.
CPC ......... *G06Q 10/067* (2013.01); *G06Q 10/083* (2013.01); *G06Q 30/0635* (2013.01)

(58) Field of Classification Search
CPC . G06Q 10/083; G06Q 30/0635; G06Q 10/067
See application file for complete search history.

(56) References Cited

U.S. PATENT DOCUMENTS 5,930,156 A 7/1999 Kennedy
6,332,098 B2 * 12/2001 Ross ............... G06Q 10/08
700/214

(Continued)

FOREIGN PATENT DOCUMENTS

| CN | 109583800 A | * 4/2019 | ............... B65G 1/04 |
| WO | WO2016020982 | 2/2016 | |
| WO | WO2018187671 | 10/2018 | |

OTHER PUBLICATIONS

"NextGen Technologies: Building the Supply Chains of the Future," by Gary Forger, Supply Chain Management Review, Sep./Oct. 2018 (Year: 2018).*

(Continued)

*Primary Examiner* — Anne M Georgalas
(74) *Attorney, Agent, or Firm* — Fish & Richardson P.C.

(57) ABSTRACT

In some implementations, a method performed by data processing apparatuses includes receiving order data that represents a plurality of ordered items for delivery to a location; selecting a first policy from a store of first policies; transforming at least a portion of the order data into a plurality of item units, based on rules associated with the selected first policy; selecting a second policy from a store of second policies; for each item unit, based on rules associated with the selected second policy, modifying the item unit to include annotated information that corresponds to operations to be performed on the item unit; and generating instructions for grouping the plurality of item units for delivery to the location, based on the annotated information for the item units.

16 Claims, 8 Drawing Sheets

(51) Int. Cl.
*G06Q 10/08* (2012.01)
*G06Q 30/06* (2012.01)

(56) References Cited

U.S. PATENT DOCUMENTS

| | | | | |
|---|---|---|---|---|
| 7,110,841 | B1* | 9/2006 | Brearley | G06Q 10/08 700/99 |
| 7,574,365 | B2* | 8/2009 | Miller | G06Q 20/102 700/214 |
| 7,656,802 | B2 | 2/2010 | Ricketts | |
| 8,326,679 | B1* | 12/2012 | Rowe | G06Q 10/08 705/28 |
| 8,650,081 | B2 | 2/2014 | Basel et al. | |
| 9,171,277 | B2* | 10/2015 | Rutt | G06Q 10/083 |
| 10,409,931 | B1* | 9/2019 | Gottin | G06F 17/18 |
| 10,745,164 | B2* | 8/2020 | Prahlad | G06Q 30/0635 |
| 2002/0193972 | A1 | 12/2002 | Kudo et al. | |
| 2003/0126103 | A1 | 7/2003 | Chen et al. | |
| 2005/0075952 | A1* | 4/2005 | Zhang | G06Q 10/087 705/28 |
| 2006/0069598 | A1* | 3/2006 | Schweitzer | G06Q 10/08 705/7.25 |
| 2013/0166468 | A1* | 6/2013 | Vogelgesang | G06Q 10/087 705/330 |
| 2014/0200946 | A1* | 7/2014 | Humphries | G06Q 10/087 705/7.25 |
| 2016/0063419 | A1 | 3/2016 | Martinez et al. | |
| 2016/0110681 | A1 | 4/2016 | Brereton et al. | |
| 2016/0275219 | A1 | 9/2016 | Feuer et al. | |
| 2016/0283621 | A1 | 9/2016 | Yang et al. | |
| 2018/0200761 | A1* | 7/2018 | Putcha | G06Q 50/28 |
| 2018/0290831 | A1 | 10/2018 | Wolf et al. | |
| 2020/0167607 | A1 | 5/2020 | McConachie | |
| 2020/0283245 | A1* | 9/2020 | Gualtieri | G09B 9/00 |

OTHER PUBLICATIONS

Almeder & Preusser, "A Hybrid Simulation Optimization Approach for Supply Chains," The 6th EUROSIM Congress on Modelling and Simulation, Sep. 9-13, 2007, 6 pages.

anylogic.com [online], "Features—AnyLogic Simulation Software," [retrieved on Mar. 30, 2018] retrieved from URL <https://www.anylogic.com/features/>, 7 pages.

anylogic.com [online], "Supply Chain GIS (Agent-based)," [retrieved on Mar. 30, 2018] retrieved from URL <https://help.anylogic.com/index.jsp?nav=%2F1_2>, 33 pages.

ArenaSimulation.com [online], "Warehouse Simulation Software," 2018, accessed Nov. 12, 2019, 4 pages.

Gagliardi et al, "A Simulation Model to Improve Warehouse Operations," Proceedings of the 2007 Winter Simulation Conference, 2007, 2012-2018.

help.anylogic.com [online], "Modeling Approaches," [retrieved on Mar. 30, 2018] retrieved from URL <https://help.anylogic.com/index.jsp?nav=%2F0_1_2>, 16 pages.

Ivanov, "Simulation-based single vs dual sourcing analysis in the supply chain with consideration of ca-pacity disruptions, Big Data and demand patterns," International Journal of Integrated Supply Management, 2017, 11(1):24-43.

Kaveh & Samani, "How Collaborative Logistics Management Increases Supply Chain Efficiency," 2009, 70 pages.

Khodyrev & Popova, "Discrete modeling and simulation of business processes using event logs," Procedia Computer Science, 2014, 29:322-331.

Onggo et al, "The Conceptual of a Distribution Warehouse Simulation," 2008, 6 pages.

Parikh, "Designing Order Picking Systems for Distribution Centers," Dissertation submitted for the degree of Doctor of Philosophy in Industrial and Systems Engineering, Sep. 1, 2006, 174 pages.

Peirleitner et al, "A simulation approach for multi-stage supply chain optimization to analyze real world transportation effects," 2016 Winter Simulation Conference (WSC), Dec. 2016, 2272-2283.

Peixoto et al, "An automated warehouse design validation using discrete simulation," 2016 IEEE 19th International Conference on Intelligent Transportation Systems (ITSC) Windsor Oceanico Hotel, Rio de Janeiro, Brazil, Nov. 1-4, 2016, 199-204.

Rabe & Clausen, "Comparing Different Simulation-based Optimisation Approaches for Simultaneous Optimisation of Production Planning Parameters," 2015, 10 pages.

Warehouse & Distribution Science, Release 0.94., Jan. 11, 2011, 321 pages.

McLean, "The expanding role of simulation in future manufacturing," Proceeding of the 2001 Winter Simulation Conference, 2001, 2:1478-1486.

\* cited by examiner

PLATFORM USING INSTRUCTION ENGINE TO SIMULATE AND PERFORM WAREHOUSE PROCESSES

CROSS REFERENCE TO RELATED APPLICATIONS

This application claims the benefit of U.S. Provisional Application Ser. No. 62/835,961, filed Apr. 18, 2019. The disclosure of the prior application is considered part of (and is incorporated by referenced in) the disclosure of this application.

TECHNICAL FIELD

This specification generally relates to a platform for simulating and performing warehouse processes, such as processes for distributing physical items from a warehouse to a store.

BACKGROUND

Warehouse management systems (WMS) can perform a variety of operations to manage the physical distribution of goods in and out of warehouses. For example, a WMS can receive orders to be distributed from a warehouse and can translate those orders into specific warehouse operations, such as selecting particular pallets from locations in the warehouse and loading them onto trucks for distribution. WMS systems have traditionally been designed to focus on processing orders within the warehouse. For example, a WMS may simply identify operations that are needed to fulfill an order and send those out to be performed by the next available resource within the warehouse (e.g., send out instructions to forklift operator).

Simulation modeling platforms have been used to facilitate simulation modeling for various business and industrial processes. With the platforms, users may develop custom models for discrete elements (e.g., processes and agents), and may define interactions between the elements. By performing simulations, for example, experiments may be conducted to determine how randomness and parameter changes affect model behavior. Simulation results may be analyzed and changes may be made based on the analysis to improve the business and industrial processes.

SUMMARY

This document generally describes computer systems, processes, program products, and devices for providing a platform including an instruction engine to simulate and/or perform warehousing processes. The platform can be designed to efficiently generate, test, and deploy instructions for performing warehousing operations that optimize considerations for the entire supply chain (not simply optimizing warehousing considerations). For example, focusing solely on warehousing considerations, such as how to most efficiently and/or quickly process orders within the warehouse, may make operations performed by other parts of the supply chain less efficient, such as placing products distributed from a warehouse on store shelves. For instance, it may be more efficient from a warehousing perspective to pack pallets that are distributed to a store as full as possible. However, this may make the store operations less efficient when the pallet is packed with goods that have product placement locations scattered about different locations. While warehousing operations themselves can create complexity, adding in considerations for the other parts of the supply chain can create significant complexity that poses computational difficulties. For example, considering all of the possible options and variations for warehousing operations to account for considerations of the entire supply chain may be computationally inefficient and may not be practically solvable in real time, or on a recurring basis, as would be performed by a system (e.g., WMS) repeatedly processing orders.

The platforms disclosed throughout this document are designed to efficiently generate instructions outline a set of warehousing operations to fulfill warehouse orders that provide an optimized solution for the entire supply chain. Such instructions can be used to simulate warehouse processes as well as their impact on the entire supply chain, the outcomes of which can be used to refine the instructions that are generated. The instructions can also be used to perform the warehousing processes in an actual, physical warehouse. The instructions can be generated using any of a variety of techniques, such as through the use of multiple layers of swappable policies with each layer focusing on one or more factors of the ultimate warehousing solution, such as timing, grouping of products, and others. For instance, performing simulations of distribution processes may be technically challenging due to the complexity and sheer volume of possible different options for various factors and sub-processes involved. For example, the potential consideration of an overall process for distributing physical items from a warehouse to a store may include sub-processes for determining how to group product orders into units for shipment, for determining a path that a unit takes through a warehouse when being prepared for shipment, for determining how units are to be sorted into containers, for prioritizing units for shipment, for loading containers into carrier vehicles, and for scheduling when various tasks will be performed and when delivery vehicles will arrive and depart. Each of the sub-processes may be performed according to various different policies, and can be used to generate the instruction set that ultimately outlines the warehousing processes. A policy, for example, can include a set of rules for performing a sub-process, can accept one or more parameters, and can generate output data, with different policies including different rules, possibly different input parameters, and possibly different output data. When performing a simulation of distributing physical items, for example, many different policy combinations may be attempted for the various sub-processes to determine an optimized overall process, which can be reflected in the instruction sets that are generated. The disclosed technology can provide techniques to facilitate generating comprehensive instruction sets that can be used to simulate and/or perform warehousing processes and sub-processes through the use of various policy combinations.

In some implementations, a computer-implemented method performed by data processing apparatuses includes: receiving order data that represents a plurality of ordered items for delivery to a location; selecting, from a store of first policies, a selected first policy, each first policy in the store of first policies including different rules for transforming the order data into item units; transforming at least a portion of the order data into a plurality of item units, based on rules associated with the selected first policy; selecting, from a store of second policies, a selected second policy, each second policy in the store of second policies including different rules for performing operations on an item unit; for each item unit, based on rules associated with the selected second policy, modifying the item unit to include annotated information that corresponds to operations to be performed on the item unit; and generating instructions for grouping the plurality of item units for delivery to the location, based on the annotated information for the item units.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations may include any, all, or none of the following features. The order data may be received from an order generation simulation. One or more first parameter values may be received for the selected first policy, and at least a portion of the order data may be transformed into the plurality of item units according the received one or more first parameter values. At least two of the first policies in the store of first policies may accept different parameters. A selected third policy may be selected from a store of third policies, each third policy in the store of third policies including different rules for performing operations on the item unit. For each item unit, according to the selected third policy and based at least in part on its annotated information, the item unit may be modified to include additional annotated information that corresponds to additional operations to be performed on the item unit. Generating instructions for grouping the plurality of item units for delivery to the location may be based on the additional annotated information for the item units. A simulation may be performed using the generated instructions for grouping the plurality of items for delivery to the location, and simulation results may be determined for the simulation. Evaluating the simulation results may be based on one or more metrics. One or more of the selected first policy or the selected second policy may be modified based on evaluating the simulation results. One or more of a different selected first policy or a different selected second policy may be selected; different instructions may be generated for grouping the plurality of items for delivery to the location; a different simulation may be performed using the different generated instructions for grouping the plurality of items for delivery to the location, and different simulation results may be determined for the different simulation; the simulation results may be compared with the different simulation results; and based on the comparing, an optimized policy combination may be selected from among a policy combination used in the simulation and a different policy combination used in the different simulation. Additional order data may be received from an order generation system, and additional instructions may be generated for grouping an additional plurality of item units for delivery to the location. The additional generated instructions may be provided for presentation on a display of a computing device.

The systems, devices, program products, and processes described throughout this document can, in some instances, provide one or more of the following advantages. Instruction sets for performing and/or simulating sub-processes of an overall process may be readily determined using, for example, sets of swappable policies, which can facilitate execution and comparison of a large number of instruction sets to identify, for example, optimized warehousing processes and policy combinations. A flexible framework with an instruction engine can facilitate chaining instruction sets and simulations of sub-processes together to generate results for an overall simulation. Using the flexible framework with instruction engine, solutions can be simultaneously determined for an optimal configuration (e.g., item containerization within a carrier vehicle) and for an optimal process to arrive at the optimal configuration (e.g., instructions for the item containerization). Policies used to generate instruction sets to perform warehousing processes and/or simulations thereof can be separated from the framework that implements the policies, facilitating development and maintenance of the policies and the framework. A feedback loop may be used to determine whether simulations are accurate through comparisons of simulation results with measured data, which can be used to refine and improve upon instruction set generation. Optimized sets of instructions to perform warehousing operations can be determined in an efficient manner that generate optimized solutions for the entire supply chain (and not just optimized for the warehouse itself).

Other features, aspects and potential advantages will be apparent from the accompanying description and figures.

DESCRIPTION OF DRAWINGS

Like reference symbols in the various drawings indicate like elements

DETAILED DESCRIPTION

This document describes technology that can generate instruction sets to perform and/or simulate warehousing operations using an instruction engine that can efficiently and effectively generate, compare, and arrive at optimized warehousing processes that take into consideration an entire supply chain. Simulating distribution processes may be generally challenging from a technical perspective due to the various factors and sub-processes involved. For example, an overall process for distributing physical items from a warehouse to a store may include sub-processes for determining how to group product orders into units for shipment (e.g., individual items, cases), for determining a path that a unit takes through a warehouse when being prepared for shipment, for determining how units are to be sorted into containers (e.g., pallets, boxes), for prioritizing units for shipment, for loading containers into carrier vehicles (e.g., trucks), and for scheduling when various tasks will be performed and when delivery vehicles will arrive and depart. To solve this problem, an instruction engine can use a flexible policy framework that implements various swappable policies for each the sub-processes included in the overall process, and that generates instructions based on the swappable policies. Different policy combinations can result in differing instruction sets and, as a result, differing warehousing processes. A policy, for example, can include a set of rules for performing a sub-process, can accept one or more parameters, and can generate output data, with different policies including different rules, possibly different input parameters, and possibly different output data. Many different policy combinations may be readily evaluated when simulating the various sub-processes, and simulations of the sub-processes may be chained together within the policy framework to simulate and determine an optimal overall process.

Figure 1:
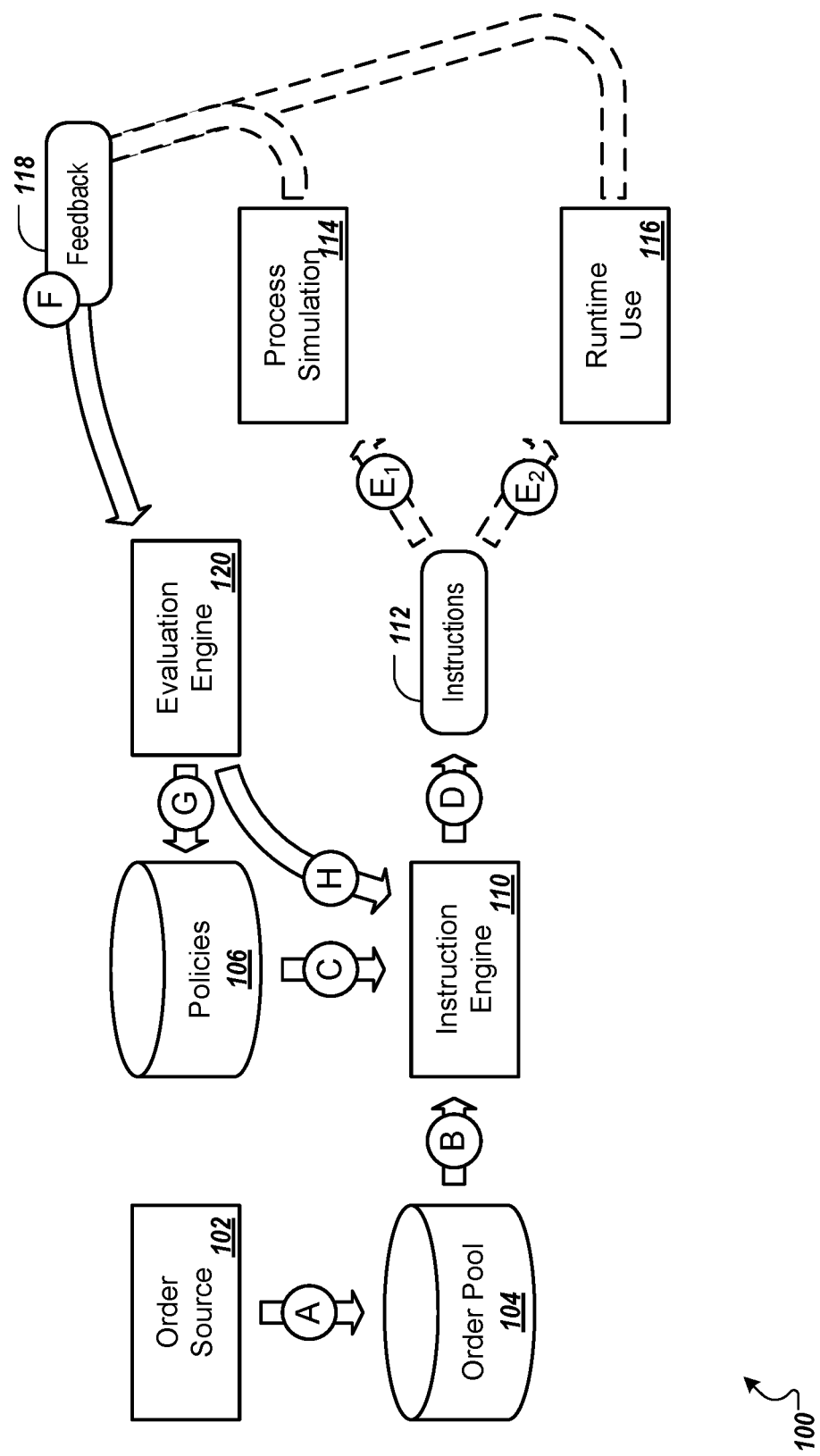
FIG. 1 is a conceptual diagram of an example system for performing process simulations using an instruction engine that implements swappable policies.

FIG. 1 is a conceptual diagram of an example system 100 for performing process simulations using an instruction engine that implements swappable policies, as represented in example stages A-H. In the depicted example, the system 100 can be used for generating instructions for processing item delivery orders for distributing physical items from a warehouse to a store. The system 100 can include, for example, a WMS that is configured to use swappable policies to simulate and/or perform warehousing operations. The generated instructions can be used for process simulations and/or for runtime use, for example, and feedback can be used to refine the policies and/or policy framework.

At stage A, for example, order data is received from an order source 102. In some implementations, order data may include data that defines orders for one or more items (e.g., products) to be transported from a first location (e.g., a warehouse) to a second, different location (e.g., a store, a residence). For example, the order data can include a product identifier, a product quantity, an order timestamp, a requested delivery date/time, a requested delivery location, and other relevant information for one or more orders. In some implementations, order data may represent orders generated by an order simulation. For example, the order source 102 can be a computer simulation that generates order data that represents product orders (e.g., store orders, customer orders) based on historical and/or projected product demand. In some implementations, order data may represent actual orders. For example, the order source 102 can be a computer system that provides order data for orders that have been placed by various entities (e.g., stores, customers). Regardless of the type of order source, order data received from the order source 102 can be added to an order pool 104. For example, the order pool 104 can include one or more types of computer data storage (e.g., databases, file systems, and/or cached data sources) configured to store received order data.

At stage B, for example, order data is received, analyzed, and processed by an instruction engine 110. For example, the instruction engine 110 can execute software that analyzes and/or processes the received order data, and can run on one or more computing devices including, but not limited to network servers, application servers, or web servers. In general, the instruction engine 110 implements a policy framework that manages an overall process for generating instructions for performing a task (e.g., distributing physical items from a warehouse to various stores and/or customers), the overall process including various sub-processes (e.g., grouping orders into units, routing units through a warehouse, sorting units into containers, prioritizing units for shipment, loading containers into vehicles, task scheduling, etc.). Each of the sub-processes, for example, may be associated with various policies, each policy representing a different strategy for carrying out the sub-process. A policy, for example, can include a set of rules for performing its respective sub-process according to a strategy.

In some implementations, order data may be periodically received by an instruction engine. For example, the instruction engine 110 can receive order data from the order pool 104 based on a defined schedule (e.g., 7:00 AM, 1:00 PM, and 5:00 PM, or another suitable schedule). As another example, the instruction engine 110 can receive order data from the order pool 104 based on a defined interval (e.g., once per minute, once per hour, once per four hours, once per day, or another suitable interval).

In some implementations, order data may be provided to an instruction engine in response to a command provided by a system user. For example, a user of the system 100 can provide a command to the instruction engine 110 to receive order data from the order pool 104 after it has been populated by results from an order simulation. As another example, a user of the system 100 can provide a command to the instruction engine 110 to receive order data from the order pool 104 at any time when instructions are desired for processing the order data (e.g., simulated order data and/or actual order data).

At stage C, for example, a policy combination is selected by the instruction engine 110. For example, the instruction engine 110 can access a policies data store 106 that stores, for each of a plurality of sub-processes of an overall process, one or more different policies for performing the sub-process. The policies data store 106, for example, can include one or more types of computer data storage (e.g., databases, file systems, and/or cached data sources) configured to store data that represents the policies. For example, each policy can be implemented through computer instructions that execute rules of the respective policy. Different policies generally represent different strategies for performing a given sub-process, and thus can include different rules, can possibly receive different input parameters, and can possibly generate different output data. When selecting the policy combination, for example, the instruction engine 110 can select, for each sub-process of an overall process, a suitable policy for executing the sub-process.

In some implementations, selecting a policy combination can be based, at least in part, on permutations of available policies. For example, when selecting a policy combination for sub-processes of an overall process to be simulated, the instruction engine 110 can define and/or refer to a set of possible policy combinations, such that each policy combination in the set is a different policy combination. The instruction engine 110, for example, can generate simulation instructions for each different policy combination, and can track which policy combination has been simulated. Each policy combination simulation can be performed using the same order data from the order pool 104, for example, such that simulation results may be equitably compared.

In some implementations, selecting a policy combination can be based, at least in part, on one or more selection rules. The instruction engine 110, for example, can reference selection rules that define which policy combinations may be attempted. For example, a particular policy for performing a first sub-process may or may not be compatible with a particular policy for performing a second sub-process. As another example, a particular policy for performing a first sub-process may or may not be appropriate for processing order data having particular data values (e.g., orders for particular items, orders for items that are to be delivered to particular locations, orders that are to be delivered in particular timeframes, etc.). By filtering possible policy combinations based on selection rules, for example, a number of policy combinations may be reduced, thus conserving processing resources.

In some implementations, selecting a policy combination can be based, at least in part, on stored policy combination preference data. For example, after performing multiple process simulations, each process simulation using a different policy combination, a preferred policy combination (e.g., an optimized combination) can be determined for order data having one or more attributes (e.g., orders for items of a particular type, orders for items that are to be delivered to a particular location, orders for items that are to be delivered in a particular timeframe, and/or another suitable attribute) and/or for orders associated with a combination of factors (e.g., an warehouse for fulfilling the order, a carrier for transporting an order shipment, and/or another suitable factor). When actual order data having the one or more attributes and/or being associated with the one or more factors is received from the order pool 104, for example, the instruction engine 110 can select the preferred policy combination based on the one or more attributes and/or factors when generating process instructions to be carried out.

At stage D, process instructions can be generated. For example, the instruction engine 110 can generate instructions 112 to perform an overall process based on the selected policy combination, including sub-processes included in the overall process. In some implementations, generated instructions may be compatible with a process simulation and/or with runtime use. At stage $E_1$, for example, the generated instructions 112 can be provided to a process simulation 114. For example, the process simulation 114 of the overall process, including sub-processes included in the overall process, can be executed by one or more servers, including, but not limited to network servers, application servers, or web servers. At stage $E_2$, for example, the generated instructions 112 can be provided for runtime use 116. For example, runtime use 116 can include an actual performance of the generated instructions 112 in a physical environment, such as a warehouse for distributing physical items to various stores and/or customers.

At stage F, after performing the process simulation 114 or the runtime use 116 based on the generated instructions 112, feedback 118 can be received by an evaluation engine 120. In general, the feedback 118 can include data associated with various measured metrics, such as an amount of time to complete a process, an amount of resources (e.g., equipment, labor, fuel, and/or financial resources) to complete the process, or other appropriate metrics. For example, the process simulation 114 based on the generated instructions 112 can produce simulation results that include the various measured metrics, whereas the runtime use 116 can be associated with the various measured metrics through data collection tools that track metrics that result from carrying out the generated instructions 112. The evaluation engine 120, for example, can execute software that evaluates the received feedback 118, and can run on one or more computing devices including, but not limited to network servers, application servers, or web servers.

In some implementations, feedback resulting from a process simulation of a policy combination may be compared with feedback resulting from a process simulation of one or more different policy combinations. For example, the system 100 can generate different instructions 112 for various different policy combinations, perform process simulation 114 for each of the different instructions 112, and compare different feedback 118 resulting from each process simulation, using the evaluation engine 120. In some implementations, comparing results of different policy combinations may include determining an optimized policy combination. Determining an optimized policy combination, for example, may be based on one or more factors, including determining that various metrics included in simulation results for the policy combination have values that meet predetermined threshold values, and/or determining that the various metrics have values that are preferable to values for metrics included in simulation results for other policy combinations. An optimized policy combination, for example, can be specifically determined for processing a particular batch of order data from the order pool 104, and/or can be generally determined for a batch of orders having one or more attributes (e.g., particular product types, particular delivery locations, particular delivery timeframes, or other suitable attributes) and/or other factors. After determining an optimized policy combination, for example, the system 100 can store data representing the combination for future reference.

In some implementations, feedback resulting from runtime use of generated instructions may be compared with feedback resulting from a process simulation based on the same instructions. For example, the system 100 can initially generate the set of instructions 112 for a selected policy combination, perform the process simulation 114 based on the instructions 112, and determine that the selected policy combination is an optimized combination. After determining that the policy combination is optimized, for example, the instructions 112 can be provided for runtime use 116, and the feedback 118 resulting from the runtime use 116 can be compared with the feedback 118 resulting from the process simulation 114. If discrepancies are identified by the evaluation engine 120 (e.g., the various measured metrics have substantially dissimilar values), for example, a source of a discrepancy may be identified in the process simulation 114 and/or in data collection techniques associated with the runtime use 116, and either or both processes may be improved.

At stage G, one or more policies can be modified and/or added, based on evaluation results. For example, based on an evaluation of the feedback 118 by the evaluation engine 120, one or more current policies stored by the policies data store 106 can be modified, and/or one or more new policies can be generated and added. For example, a system administrator can modify the rules of a particular policy, modify its parameters, and/or modify its output to improve the instructions 112 generated when the policy is included in a policy combination. As another example, a system administrator can add a new policy to the policies data store 106 that models a new strategy for performing a particular sub-process included in an overall process.

At stage H, a policy framework for chaining simulations of sub-processes can be modified, based on evaluation results. For example, based on an evaluation of the feedback 118 by the evaluation engine 120, the instruction engine 110 can be modified such that an execution of sub-processes of an overall process is changed (e.g., the sub-processes are executed in a different order, the sub-processes are executed simultaneously, the sub-processes share different data, or another suitable change).

As shown in the present example, and as will be described in additional examples below, stages A-H can be iterative, such that results for multiple different simulations can be readily compared, as well as results of simulations and runtime use. Based on a results comparison, for example, continuous improvements can be made to the sub-process policies and/or the overall framework for generating instructions based on the policies.

Figure 2:
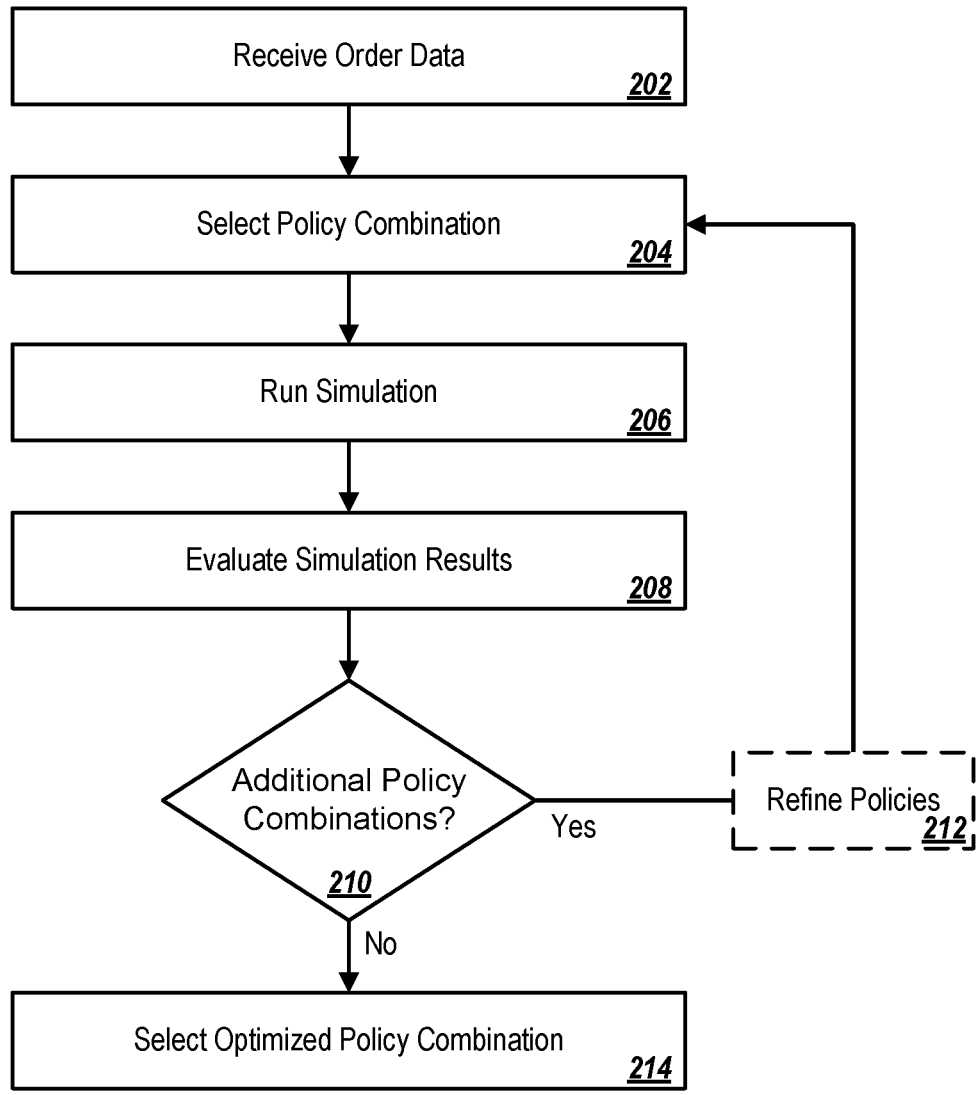
FIG. 2 shows an example process for selecting an optimized policy combination based on simulation results.

Referring now to FIG. 2, an example process 200 for selecting an optimized policy combination based on simulation results is shown. The process 200 can be performed by components of the system 100, for example, and will be described with reference to FIG. 1. However, other systems may be used to perform the same or a similar process, such as being implemented as part of a WMS and/or other warehouse management platform.

At box 202, order data is received. Referring again to FIG. 1, for example, the instruction engine 110 can receive order data from the order pool 104. The order data, for example, can include data that defines orders for products to be transported from a warehouse to a store, and may be based on results from an order generation simulation or may be based on actual orders. The order data, for example, may be periodically received by the instruction engine 110 or may be provided to the instruction engine in response to command provided by a system user.

At box 204, a policy combination is selected. For example, the instruction engine 110 can access the policies data store 106 that stores, for each sub-process of an overall order fulfillment process, one or more different policies for performing the sub-process. Selecting the policy combination, for example, can be based on selecting a permutation of available polices that has not yet been analyzed and/or can be based on one or more selection rules.

At box 206, a simulation is performed using the selected policy combination. For example, the instruction engine 110 can perform the process simulation 114 based on the policy combination selected by the instruction engine 110. In some implementations, performing a process simulation may include processing generated instructions. For example, the instructions 112 generated by the instruction engine 110 for the process simulation 114 can include instructions for performing tasks included in an overall order fulfillment process.

At box 208, simulation results are evaluated. For example, the evaluation engine 120 can receive feedback 118 resulting from the process simulation 114 and can evaluate the feedback. Evaluating simulation results, for example, can include evaluating various metrics included in the simulation results, and comparing the metric values with metric values that have resulted from simulations that have been performed using different policy combinations.

At box 210, a determination of whether additional policy combinations are available is performed. For example, the instruction engine 110 can track policy combinations when they are evaluated, and can determine whether any suitable policy combinations that have not yet been evaluated still exist.

At box 212, one or more policies are optionally refined. For example, if a policy combination is identified as not being optimal, one or more policies included in the combination may be modified to include different rules, to accept different parameters, and/or to produce different output values.

At box 204, if additional policy combinations are available, another policy combination is selected. For example, the instruction engine 110 can select another combination of policies from the policies data store 106, and the process 200 can continue at boxes 206 and 208.

At box 214, if additional policy combinations are unavailable, an optimized policy combination is selected. For example, the instruction engine 110 can select an optimized combination of policies from the policies data store 106, based on the evaluations of simulation results performed by the evaluation engine 120. An optimized policy combination, for example, can be a combination that is associated with simulation results including metric values that meet predetermined threshold values, and/or including metric values that are preferable to values for metrics included in simulation results for other policy combinations. After determining an optimized policy combination (e.g., a policy combination that has been optimized for one or more factors, including one or more factors related to order data and/or one or more factors related to a delivery environment), for example, data representing the optimized policy combination can be stored for future reference.

Figure 3:
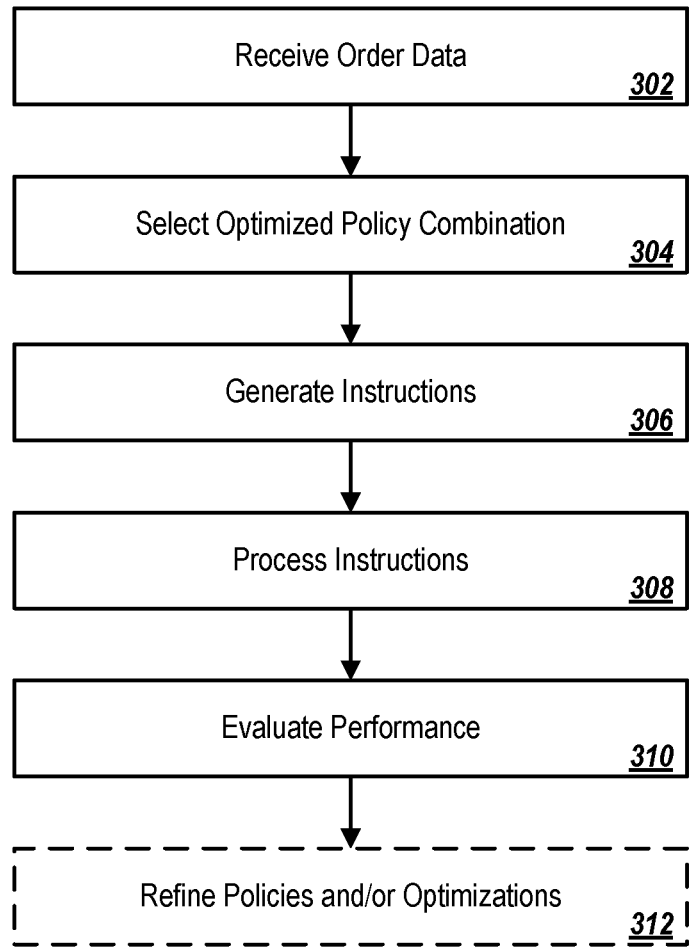
FIG. 3 shows an example process for generating instructions based on a selected optimized policy combination.

Referring now to FIG. 3, an example process 300 for generating instructions based on a selected optimized policy combination is shown. The process 300 can be performed by components of the system 100, for example, and will be described with reference to FIG. 1. However, other systems may be used to perform the same or a similar process, such as being implemented as part of a WMS and/or other warehouse management platform.

At box 302, order data is received. Referring again to FIG. 1, for example, the instruction engine 110 can receive order data from the order pool 104. The order data, for example, can include data that defines orders for products to be transported from a warehouse to a store, and may be based on actual orders that have been placed and/or on projected orders for items. The order data, for example, may be periodically received by the instruction engine 110, may be provided to the instruction engine as a result of executing a scheduling policy, or may be provided to the instruction engine in response to a command provided by a system user.

At box 304, an optimized policy combination is selected. For example, the instruction engine 110 can access the policies data store 106 that stores, for each sub-process of an overall order fulfillment process, one or more different policies for performing the sub-process. Selecting the optimized policy combination, for example, can be based on stored policy optimization information. For example, after performing the process 200 for selecting an optimized policy combination based on simulation results (shown in FIG. 2), data representing the optimized policy combination can be stored. The stored optimized policy combination used to generate the simulation results, for example, may also be used for fulfilling the orders on which the simulation is based. As another example, the stored optimized policy combination may be selected when subsequent orders are received that share one or more common attributes with the earlier orders (e.g., particular product types, particular delivery locations, particular delivery timeframes, and/or other suitable attributes), and/or that share one or more factors related to its delivery environment (e.g., warehouses from which products are to be delivered, carriers that are to deliver the products, and/or other suitable factors).

At box 306, instructions are generated based on the optimized policy combination. For example, the instruction engine 110 can generate instructions 112 based on the stored and selected optimized policy combination.

At box 308, the generated instructions are processed. For example, the instructions 112 can be provided for runtime use 116, including an actual performance of the generated instructions 112 in a physical environment, such as a warehouse for distributing physical items to various stores and/or customers.

At box 310, performance of the instructions is evaluated. For example, the evaluation engine 120 can receive feedback resulting from the runtime use 116 and can evaluate the feedback. Evaluating runtime results, for example, can include evaluating various measured metrics included in the runtime results, the metrics having been gathered through data collection tools that track metrics that result from carrying out the generated instructions 112.

At box 312, policies and/or optimizations are optionally refined. For example, if a selected policy combination does not produce runtime results that include metric values that meet a predetermined threshold value, one or more policies included in the optimized policy combination may be replaced or modified.

Figure 4A:
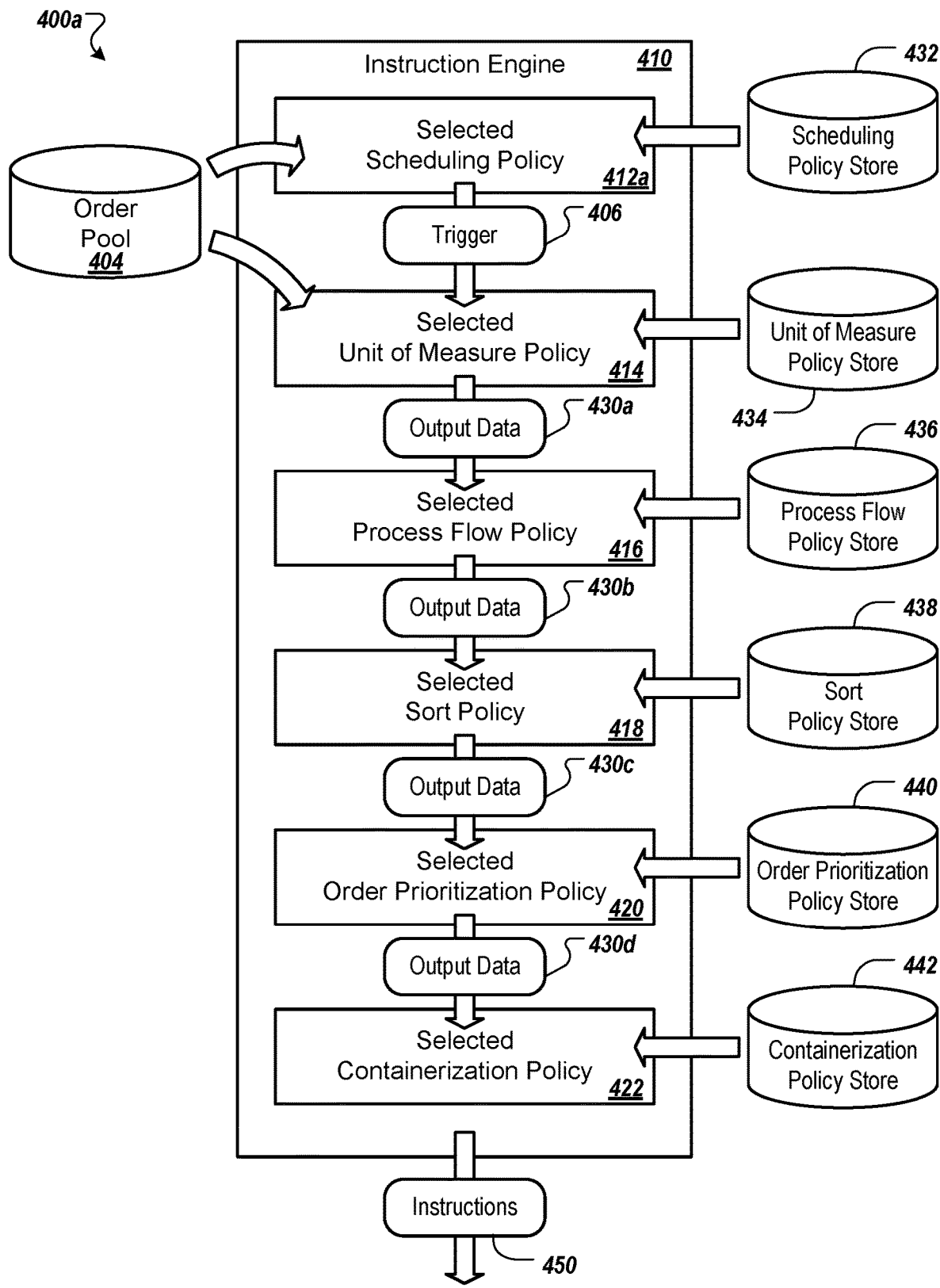
FIGS. 4A-B are conceptual diagrams of example frameworks for performing simulations of distribution processes using an instruction engine that implements swappable policies.
Figure 4B:
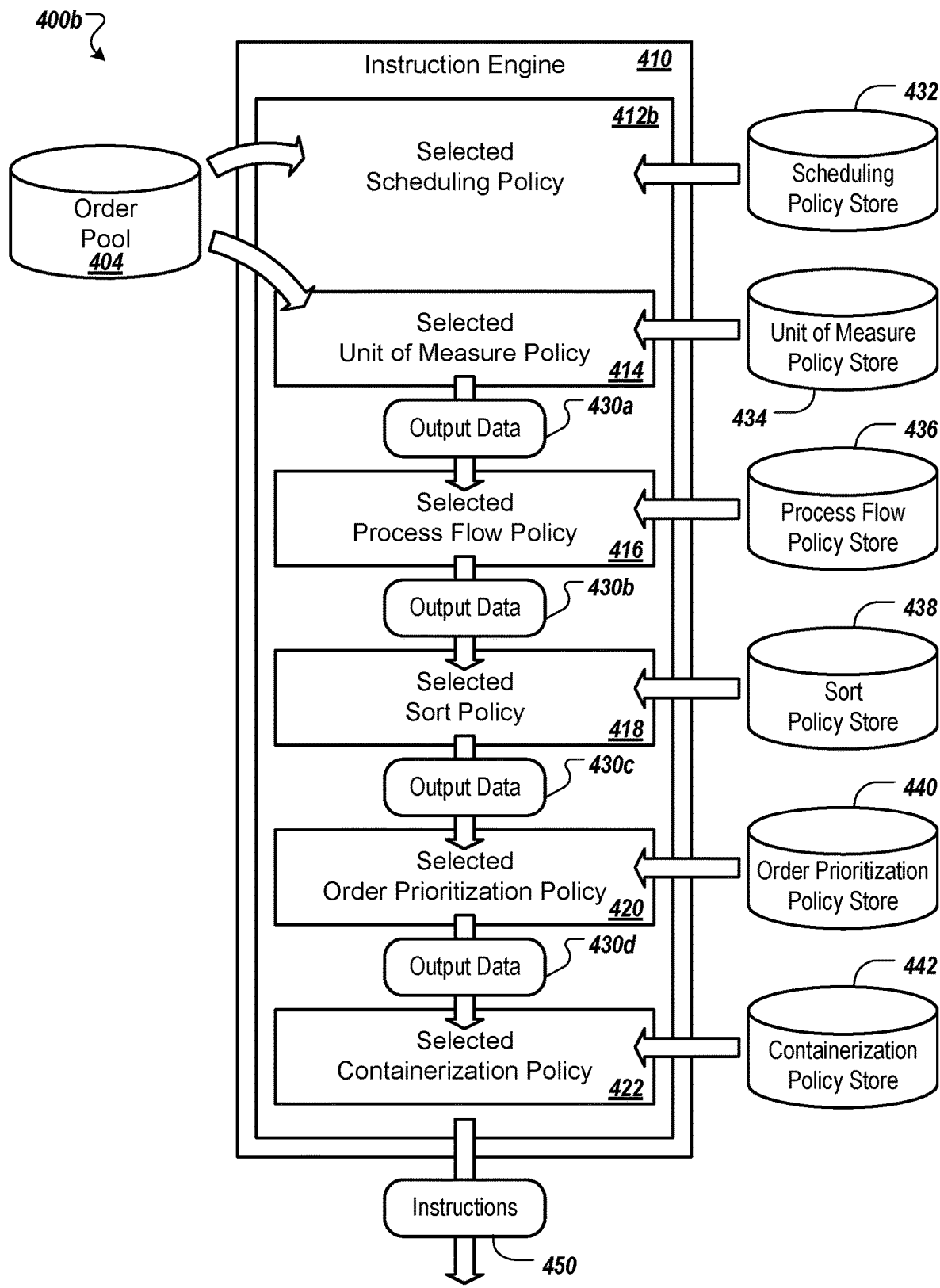

FIGS. 4A-B are conceptual diagrams of example frameworks 400a and 400b for performing simulations of distribution processes using an instruction engine that implements swappable policies. The example frameworks 400a and 400b can include an instruction engine 410 (e.g., similar to the instruction engine 110, shown in FIG. 1) that can receive, analyze, and process order data from an order pool 404 (e.g., similar to the order pool 104, also shown in FIG. 1). The instruction engine 410 shown in the present examples can generate instructions 450 for processing item delivery orders, the instructions being usable for performing process simulations and/or for performing a physical process.

The instruction engine 410, for example, includes a framework in which various sub-processes included in an overall order fulfillment process are chained together, each of the sub-processes being performed according to a swappable policy that may be selected from a respective data store. In the present examples, the instruction engine 410 can select a scheduling policy 412a (shown in FIG. 4A) or a scheduling policy 412b (shown in FIG. 4B) from a scheduling policy data store 432, a unit of measure policy 414 from a unit of measure policy data store 434, a process flow policy 416 from a process flow policy data store 436, a sort policy 418 from a sort policy data store 438, an order prioritization policy 420 from an order prioritization policy data store 440, and a containerization policy 422 from a containerization policy data store 442.

Referring to FIG. 4A, for example, the scheduling policy 412a selected within the example framework 400a can be used to determine when order data from the order pool 404 is to be processed. In some implementations, determining when to process order data may be based at least in part on a defined schedule or interval. For example, the selected scheduling policy 412a can determine that order data from the order pool 404 is to be processed according to a predetermined schedule (e.g., at one or more times per day and/or week, such as at 6:00 AM and at 6:00 PM daily, or another suitable schedule). In some implementations, determining when to process order data may be based at least in part on determining when attributes of the order data are associated with particular values. For example, the selected scheduling policy 412a can determine that order data from the order pool 404 is to be processed when a number of orders represented in the order pool meets a threshold value. As another example, the selected scheduling policy 412a can determine that order data from the order pool 404 is to be processed when a particular type of product is represented in the order pool. After determining that order data from the order pool 404 is to be processed, for example, the selected scheduling policy 412a can generate a trigger 406 that initiates the selection of further policies within the example framework 400a and the generation of the instructions 450.

Referring to FIG. 4B, for example, the scheduling policy 412b selected within the example framework 400b can facilitate a master process that periodically (e.g., once per hour, once every fifteen minutes, once every five minutes, once per minute, or another suitable time increment) performs a partial or complete simulation of processing item delivery orders, and determines when to process order data based at least in part on partial or final simulation results. For example, the selected scheduling policy 412b can take as input one or more of: data from the order pool 404, output data 430a generated by the selected unit of measure policy 414, output data 430b generated by the selected process flow policy 416, output data 430c generated by the selected sort policy 418, output data 430d generated by the selected order prioritization policy 420, output data generated by the selected containerization policy 422, the instructions 450, and/or various combinations and permutations thereof. The selected scheduling policy 412b can use these input to identify and evaluate various scheduling tradeoffs of the policies in a context of an overall supply chain, and can determine an optimal schedule for processing the orders based on these tradeoffs. If the selected scheduling policy 412b determines that simulation results, based on any of the order pool 404, the output data 430a-d, the instructions 450, and/or combinations thereof, meets one or more decision criteria (e.g., time-based criteria, resource-based criteria, quality-based criteria, etc.), the scheduling policy 412b can be used by the instruction engine 410 to determine that at least a portion of the order data from the order pool 404 is to be processed at a current time. However, if the selected scheduling policy 412b determines that simulation results, based on any of the order pool 404, the output data 430a-d, the instructions 450, and/or combinations thereof, does not meet the one or more decision criteria, the scheduling policy 412b can wait and can process order data from the order pool 404 at a later time. The selected scheduling policy 412b can be used to determine a specific future time (or range of future times) for processing the order pool 404, as well.

Further operations and output data of selected policies are shown and described with respect to FIGS. 4A and 4B. The selected unit of measure policy 414, for example, can be used to determine how to group orders into units for shipment. For example, orders can be grouped as individual items, store ship packs (e.g., a small collection of items placed in a box), or vendor case packs (e.g., a large collection of units packaged by a vendor). Possible unit of measure policies, for example, may include a constant policy and a greedy policy. For example, the constant policy can accept as parameters a unit of measure name parameter (e.g., individual item, store ship pack, or vendor case pack) and an under assign parameter (e.g., true or false). The constant policy, for example, returns only a type of unit of measure that corresponds to the unit of measure name parameter, and will either round up or down based on the value of the under assign parameter. The greedy policy, for example, can accept as parameters one or more eligible units of measure (e.g., individual item, store ship pack, and/or vendor case pack) and an under assign parameter (e.g., true or false). The greedy policy, for example, groups a set of orders by the largest unit of measure, then the middle unit of measure, then the smallest unit of measure, and will either round up or down if individual items are not selected based on the under assign parameter. Output data 430a generated by the selected unit of measure policy 414, for example, can include orders that have been grouped into respective units.

The selected process flow policy 416, for example, can be used to determine a path that a unit takes through a warehouse when being prepared for shipment. In some implementations, rules included in a process flow policy for determining a path for a unit may be based at least in part on various unit characteristics, such as size, weight, handling specifications, refrigeration specifications, and other suitable characteristics. In some implementations, rules included in a process flow policy for determining a path for a unit may be based at least in part on a capacity for the path. The determined path for a unit may be relevant to subsequent sub-processes, for example, because units that travel along different paths generally may not be placed in a same container. Output data 430b generated by the selected process flow policy 416, for example, can include units that have been assigned to particular paths.

The selected sort policy 418, for example, can be used to determine how units will be sorted into containers. In some implementations, rules included in a sort policy for a unit may be based at least in part on a location within a store (e.g., a department, an aisle, a section) at which the unit will be stocked. For example, the sort policy can determine that units that are to be stocked at a same location are to be sorted into a same container. In some implementations, rules included in a sort policy for a unit may be based at least in part on optimizing space within a container. Output data 430c generated by the selected sort policy 418, for example, can include units that have been assigned to particular paths and have been sorted into particular containers.

The selected order prioritization policy 420, for example, can be used to determine how units are to be prioritized for shipment. In general, order prioritization may be a factor when available space on a carrier vehicle (e.g., a truck) is limited, with units having a higher prioritization being loaded onto the vehicle rather than units having a lower prioritization. In some implementations, rules included in an order prioritization policy may be based at least in part on when an order for a unit was placed. For example, the order prioritization policy can determine that units are to be prioritized according to corresponding order placement timestamps. In some implementations, rules included in an order prioritization policy may be based at least in part on a value of potential sales of a unit. For example, the order prioritization policy can determine that units that are associated with higher potential sales are to be prioritized over units that are associated with lower potential sales. Output data 430d generated by the selected order prioritization policy 420, for example, can include units that have been assigned to particular paths, have been sorted into particular containers, and have been prioritized.

The selected containerization policy 422, for example, can be used to generate specific instructions 450 for moving units through a warehouse, packing the units into containers, and loading the units on to a carrier vehicle, until a vehicle capacity is reached, based on the output data 430d that has been sequentially added to by policies for implementing the previous sub-processes.

Figure 5:
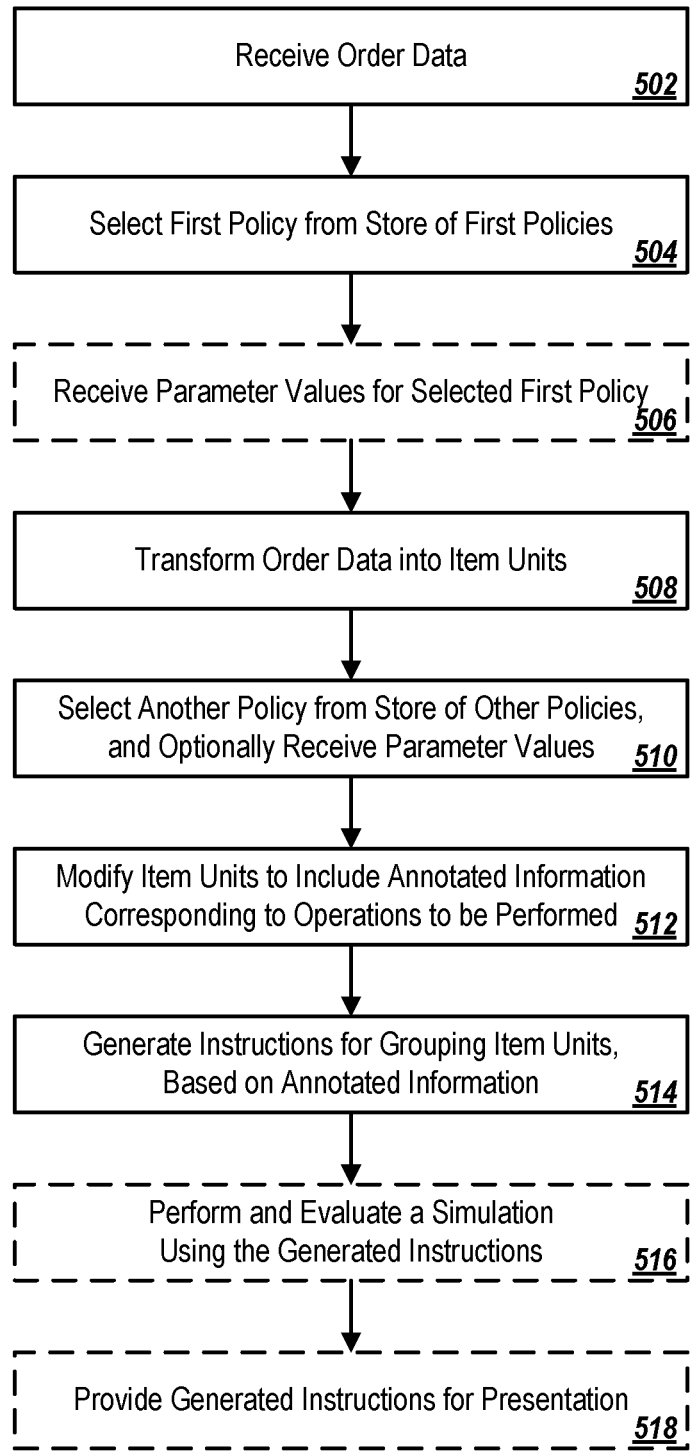
FIG. 5 shows an example process for generating instructions using an instruction engine that implements swappable policies.

Referring now to FIG. 5, an example process 500 is shown for generating instructions using an instruction engine that implements swappable policies. The process 500 can be performed by components of the system 100 and/or the example framework 400, for example, and will be described with reference to FIG. 1 and FIG. 4. However, other systems may be used to perform the same or a similar process, such as being implemented as part of a WMS and/or other warehouse management platform.

At box 502, order data is received. Referring to FIG. 1, for example, the instruction engine 110 can receive can receive order data from the order pool 104. As another example, the instruction engine 410 (shown in FIG. 4) can receive order data from the order pool 404 (also shown in FIG. 4). In general, received order data can represent orders for one or more items (e.g., products) to be transported from a first location (e.g., a warehouse) to a second, different location (e.g., a store, a residence). The received order data, for example, can be provided by the order source 102, which may generate simulated orders, or may provide actual orders.

At box 504, a first policy is selected from a store of first policies. Referring to FIG. 1, for example, the instruction engine 110 can receive policy data (e.g., computer instructions that execute policy rules) for the selected first policy from the policies data store 106. As another example, the instruction engine 410 (shown in FIG. 4) can receive policy data from any of the policy stores 432, 434, 436, 438, 440, or 442. In the present example, after determining when order data is to be processed from the order pool 404 (e.g., using the selected scheduling policy 412), the instruction engine 410 can begin generating instructions by receiving order data from the order pool 404 and selecting the selected unit of measure policy 414 from the unit of measure policy store 434. As described above with respect to FIG. 4, for example, each unit of measure policy in the unit of measure policy store 434 (e.g., a constant policy, a greedy policy, or other unit of measure policy) can include different rules for transforming order data from the order pool 404 into item units (e.g., individual items, store ship packs, or vendor case packs) and/or can use different parameters.

Figure 6A:
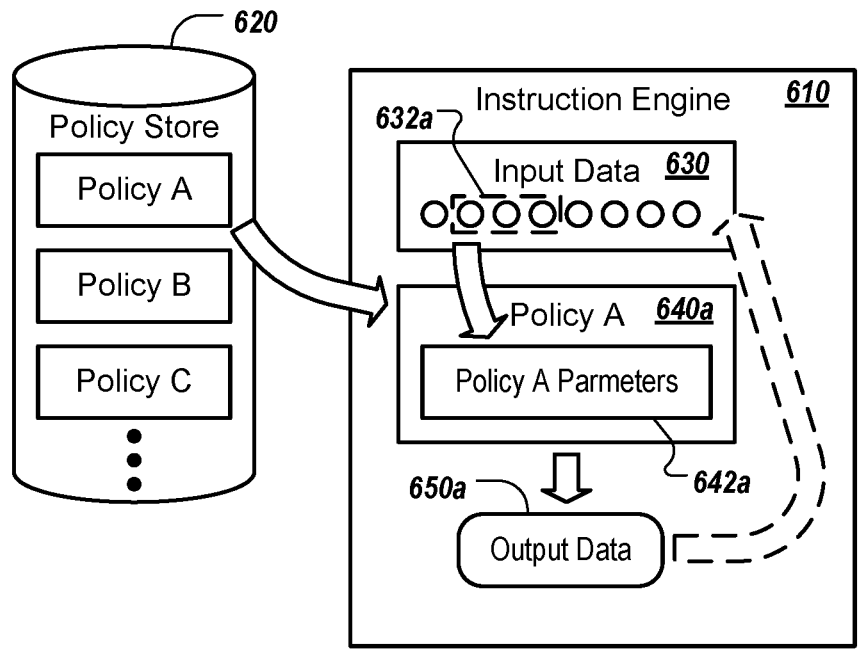
FIGS. 6A-B are conceptual diagrams of an example framework for an instruction engine that implements swappable policies.

At box 506, parameter values are optionally received for a selected first policy. Referring now to FIG. 6A, for example, instruction engine 610 (e.g., similar to the instruction engine 110 (shown in FIG. 1) and/or the instruction engine 410 (shown in FIG. 4)) can select a policy (e.g., Policy A, Policy B, or Policy C) from policy store 620 which includes various different policies of a same type. In general, different implementations of a same type of policy (e.g., a unit of measure policy, a process flow policy, a sort policy, an order prioritization policy, a containerization policy, or another type of policy) may evaluate different data when generating output. For example, a simplistic sort policy might evaluate data associated with a store aisle destination of a given item when sorting items into containers, whereas a holistic sort policy might also evaluate data associated with item sizes, and then sort items into containers such that airspace within the containers is minimized. In the present example, policy 640a (Policy A) is selected by instruction engine 610 from policy store 620, and the instruction engine can provide, for Policy A's parameters, corresponding data values 632a from input data 630.

In some implementations, at least two of the first policies in the store of first policies may accept different parameters. The input data 630, for example, can include a pool of data that is maintained for possible use by multiple different policies, with each different policy receiving as parameter values only a portion of the input data that corresponds to its particular parameters, facilitating flexible swapping of policies by the instruction engine 610. When a policy is executed, for example, output data generated by the policy can then be added to the data pool and be maintained as possible input data 630 for use by subsequent policies, facilitating chaining policies together by the instruction engine 610. In the present example, selected policy 640a (Policy A) may receive parameter values 632a from the input data 630 for its "Policy A" Parameters 642a (shown in FIG. 6A), whereas if policy 640b (Policy B) were selected, it may receive different parameter values 632b from the input data 630 for its different "Policy B" Parameters 642b (shown in FIG. 6B).

At box 508, at least a portion of the order data is transformed into item units, based on rules associated with the selected first policy. Referring again to FIG. 4, for example, instruction engine 410 can generate output data 430a based on rules associated with the selected unit of measure policy 414 (e.g., a constant policy, a greedy policy, or another unit of measure policy). The output data 430a, for example, can include data that defines item units (e.g., individual items, store ship packs, vendor case packs, or other suitable item units) in which items for fulfilling orders corresponding to the order data are grouped. In general, different item units may have different advantages and disadvantages with respect to processing the item units by subsequent selected policies (e.g., the selected process flow policy 416, the selected sort policy 418, the selected order prioritization policy 420, and the selected containerization policy 422). For example, vendor case packs may be more efficiently handled than other item units (but may result in overstock), whereas individual items may be less efficiently handled than other item units (but may result in less inventory overhead). In some implementations, item units may have a fixed schema (e.g., a standard set of fields that can be updated by various policies). For example, data generated by the selected unit of measure policy 414 that represents an item unit for one or more order items can have a fixed schema, such that item unit data can be received and updated throughout a policy chain.

Figure 6B:
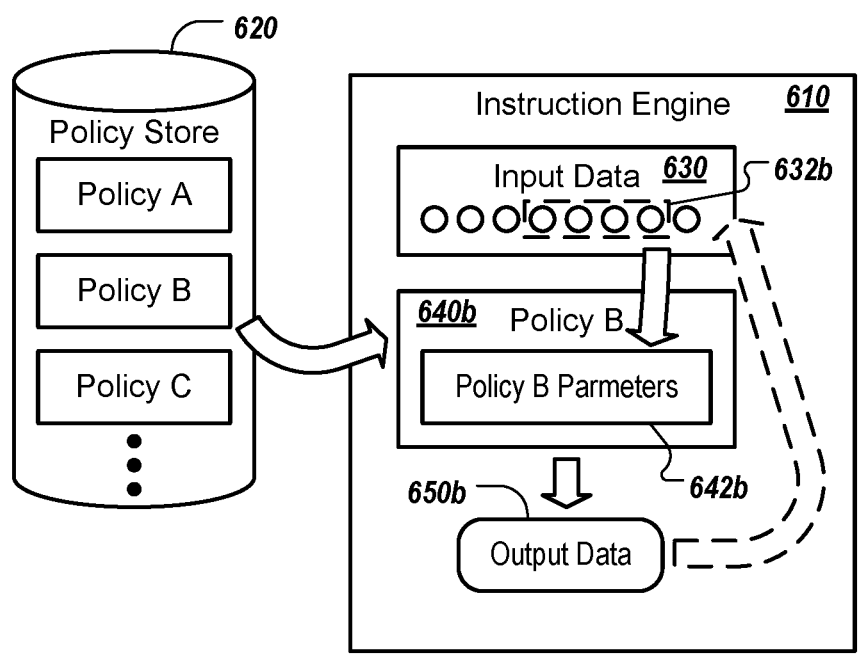

In some implementations, at least a portion of the order data may be transformed into item units according to one or more received parameter values. Referring again to FIG. 6A, for example, the instruction engine 610 can use policy 640a (Policy A) to transform the input data 630 into output data 650a, according to the data values 632a for the "Policy A" parameters. Referring now to FIG. 6B, if policy 640b (Policy B) were instead selected, for example, the instruction engine 610 could use policy 640b (Policy B) to transform the input data 630 into different output data 650b, according to the data values 632b for the "Policy B" parameters. Each of the output data 650a and the output data 650b, for example, can represent a different mix of item units for fulfilling orders, even though the input data 630 (e.g., prior to implementing policy 640a or 640b) may be the same. For example, output data 650a may include data that represents order items having been grouped into only vendor case packs, whereas output data 650b may include data that represents order items having been grouped into a mix of vendor case packs, store ship packs, and individual items.

At box 510, another policy is selected from a store of other policies, and parameter values are optionally received for the other policy. Referring again to FIG. 4, for example, the instruction engine 410 can select the selected process flow policy 416 from the process flow policy store 436. Each process flow policy in the process flow policy store 436, for example, can include different rules for determining a path that a unit takes through a warehouse when being prepared for shipment, and can possibly include different parameters. The instruction engine 410, for example, can provide output data 430a generated using rules of the selected unit of measure policy 414 (e.g., including order data transformed into item units) for use by the selected process flow policy 416. At box 512, item units are modified to include annotated information corresponding to operations to be performed on the item units. For example, the selected process flow policy 416 can annotate item unit data represented in the received output data 430a with additional data (e.g., data specifying a path for the item unit through a warehouse), and can include annotated item unit data in the output data 430b.

In some implementations, one or more further policies may be selected from stores of further policies, parameter values may optionally be received for the further policies, and item units may be modified to include further annotated information that corresponds to further operations to be performed on the item units. For example, the instruction engine 410 can select the selected sort policy 418 from the sort policy store 438 (e.g., each sort policy including different rules for determining how item units are to be sorted into containers, and possibly including different parameters), and can select the selected order prioritization policy 420 from the order prioritization policy store 440 (e.g., each order prioritization policy including different rules for determining how item units are to be prioritized for shipment, and possibly including different parameters). The instruction engine 410, for example, can provide output data 430b generated using rules of the selected process flow policy 416 (e.g., including order data transformed into item units and having been annotated by the selected process flow policy 416) to the selected sort policy 418, which can use its rules to generate output data 430c that includes additional annotated data (e.g., data specifying a container for the item unit). After the output data 430c has been generated, for example, the instruction engine 410 can provide the output data 430c (e.g., including order data transformed into item units and having been annotated by the selected process flow policy 416 and the selected sort policy 418) generated using rules of the selected sort policy 418, to the selected order prioritization policy 420. The selected order prioritization policy 420, for example, can generate output data 430d (e.g., including order data transformed into item units and having been annotated by the selected process flow policy 416, the selected sort policy 418, and the selected order prioritization policy 420) using its rules, for use by the selected containerization policy 422.

At box 514, instructions for grouping item units are generated, based on annotated information. Referring again to FIG. 4, for example, the selected containerization policy 422 can receive the output data 430d (e.g., including order data transformed into item units, and can generate specific instructions 450 for moving the item units through a warehouse, packing the item units into containers, and loading the item units on to a carrier vehicle, based on the annotated data for the item units that has been annotated by one or more previously selected policies (e.g., policies 416, 418, and/or 420).

At box 516, a simulation is optionally performed using generated instructions, and results of the simulation are optionally evaluated. Referring again to FIG. 1, for example, the instructions 112 (e.g., similar to instructions 450, shown in FIG. 4) can be provided to process simulation 114 (e.g., at stage $E_1$). Evaluating simulation results, for example, can include evaluating the feedback 118 (e.g., at stage F), including evaluating various metrics included in the simulation results, and comparing the metric values with metric values that have resulted from simulations that have been performed using different policy combinations. In some implementations, one or more selected policies may be modified based on evaluating simulation results. For example, based on an evaluation of the feedback 118 by the evaluation engine 120, one or more current policies stored by the policies data store 106 can be modified (e.g., by a system administrator). The system administrator, for example, can modify the rules of a particular policy, modify its parameters, and/or modify its output.

In some implementations, one or more of a different first policy, different second policy, etc., may be selected, and different instructions may be generated for grouping items for delivery to a location. A different simulation may be performed using the different instructions, and different simulation results may be determined. The simulation results may be compared, and based on the comparison, an optimized policy combination may be selected. Referring to FIG. 2 and the above description, for example, the example process 200 is described for selecting an optimized policy combination based on simulation results. The optimized policy combination, for example, can then be used for generating and providing instructions for fulfilling actual orders that have been placed for products to be transported from a warehouse. For example, additional order data may be received from an order generation system, and additional instructions may be generated for grouping item units associated with the additional order data for delivery to a location. Referring to FIG. 3 and the above description, for example, the example process 300 is described for generating instructions based on a selected optimized policy combination.

At box 518, generated instructions are optionally provided. Referring again to FIG. 1, for example, the generated instructions 112 can be provided for runtime use 116 (e.g., at stage $E_2$). Runtime use 116, for example, can include providing human-readable instructions based on the generated instructions 112 on a display of a computing device (e.g., a mobile computing device, such as a smartphone device, a tablet device, a personal digital assistant, or another suitable type of computing device, not shown) for presentation to an operator, and can include an actual performance of the generated instructions 112 in a physical environment (e.g., a warehouse). Based on the human-readable instructions, for example, the operator of the computing device can perform physical steps for moving units through a warehouse, packing the units into containers, and/or loading the units on to a carrier vehicle.

Figure 7:
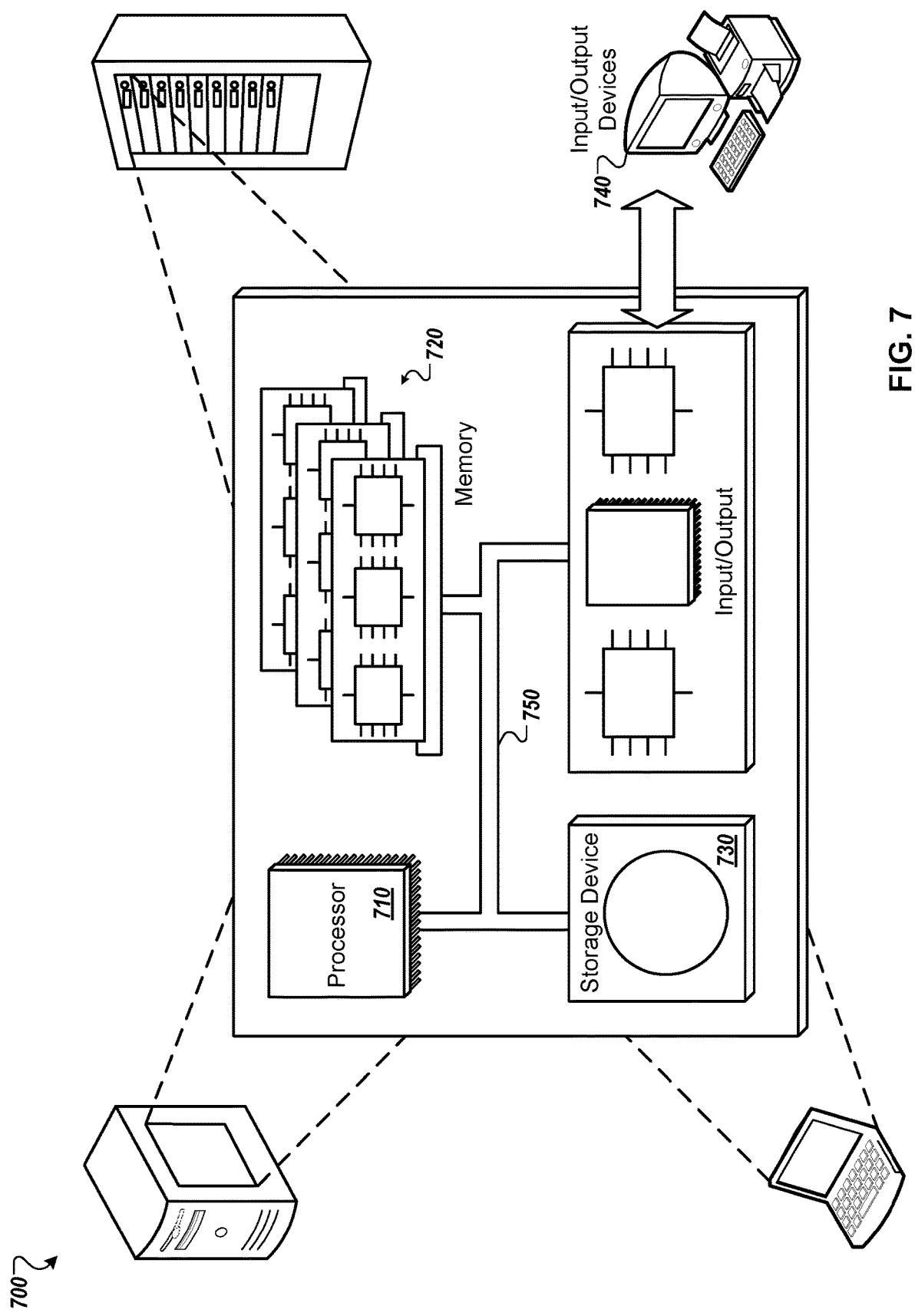
FIG. 7 is a schematic diagram that shows an example of a computing system.

FIG. 7 is a schematic diagram that shows an example of a computing system 700. The computing system 700 can be used for some or all of the operations described previously, according to some implementations. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method for generating instructions for performing warehousing operations for fulfilling orders, the method comprising:
   receiving, by a computer system, order data that represents a plurality of ordered items for delivery to a location;
   selecting, by the computer system, from a data store of first policies, a selected first policy, each first policy in the data store of first policies including different rules for grouping items represented in the order data into item units;
   transforming, by the computer system, at least a portion of the order data into first output data that includes item unit data that defines a plurality of item units in which items represented in the order data have been grouped, comprising (i) receiving first parameter values that correspond to parameters accepted by the selected first policy, (ii) generating the first output data, based on rules associated with the selected first policy and according to the first parameter values, and (iii) adding, to a data pool that is maintained for use by multiple different downstream policies, the first output data that includes the item unit data, wherein each item unit datum in the item unit data represents a grouping of items represented in the order data according to an execution of the rules of the selected first policy using the first parameter values;
   selecting, by the computer system, from a data store of second policies, a selected second policy, each second policy in the data store of second policies including different rules for performing initial operations on an item unit for moving the item unit through a warehouse;
   annotating, by the computer system, the item unit data, comprising (i) receiving, from the data pool to which the first output data has been added, second parameter values that correspond to parameters accepted by the selected second policy, (ii) for each item unit, based on rules associated with the selected second policy and according to the second parameter values, modifying an item unit datum that represents the item unit to include annotated information that corresponds to the initial operations to be performed on the item unit for moving the item unit through the warehouse, and (iii) adding, to the data pool, second output data that includes the annotated item unit data, wherein each annotated item unit datum in the item unit data represents a grouping of items represented in the order data that is to be moved through the warehouse according to an execution of the rules of the selected second policy using the second parameter values;
   selecting, by the computer system, from a data store of third policies, a selected third policy, each third policy in the data store of third policies including different rules for performing subsequent operations on the item unit for packing the item unit into a container;
   annotating, by the computer system, the item unit data, comprising (i) receiving, from the data pool to which the first output data and the second output data has been added, third parameter values that correspond to parameters accepted by the selected third policy, and (ii) for each item unit, based on rules associated with the selected third policy and according to the third parameter values, modifying the item unit datum that represents the item unit to include annotated information that corresponds to the subsequent operations to be performed on the item unit, wherein each annotated item datum in the item unit data represents a grouping of items represented in the order data that is to be packed into a container according to an execution of the rules of the selected third policy using the third parameter values;
   generating, by the computer system, instructions for (i) grouping items represented in the order data into item units, based on the item unit data that defines the plurality of item units per the selected first policy, (ii) moving the item units through the warehouse, based on the annotated information that corresponds to the initial operations to be performed on the item units per the selected second policy, and (iii) packing the item units into containers for delivery to the location, based on the annotated information that corresponds to the subsequent operations to be performed on the item units per the selected third policy;
   performing an automated simulation using the generated instructions for (i) grouping items represented in the order data into item units, (ii) moving the items units through the warehouse, and (iii) packing the item units into containers for delivery to the location;
   determining simulation results for the automated simulation;
   evaluating the simulation results based on one or more metrics; and
   modifying one or more of the selected first policy, the selected second policy, and the selected third policy, based on evaluating the simulation results,
   wherein selecting the selected second policy and the selected third policy is based on selection rules that (i) specify policies based on the order data, and (ii) define combinations of first, second, and third policies, wherein the combinations are defined based at least in part on a comparison of simulation results of previously performed simulations of warehousing operations for fulfilling orders.

2. The computer-implemented method of claim 1, wherein the order data is received from an order generation simulation.

3. The computer-implemented method of claim 1, wherein the execution of the rules of the selected first policy is performed using only a portion of data from the data pool as the first parameter values.

4. The computer-implemented method of claim 3, wherein at least two of the first policies in the data store of first policies accept different parameters.

5. The computer-implemented method of claim 1, wherein the generated instructions for (i) grouping items represented in the order data into item units, (ii) moving the items units through the warehouse, and (iii) packing the item units into containers for delivery to the location are executable by one or more servers that are configured to perform a simulation of performing the warehousing operations.

6. The computer-implemented method of claim 1, further comprising:

selecting one or more of a different selected first policy, a different selected second policy, and a different selected third policy;

generating different instructions for (i) grouping items represented in the order data into item units, (ii) moving the item units through the warehouse, and (iii) packing the item units into containers for delivery to the location;

performing a different simulation using the different generated instructions, and determining different simulation results for the different simulation;

comparing the simulation results with the different simulation results; and based on the comparing, selecting an optimized policy combination from among a policy combination used in the simulation and a different policy combination used in the different simulation.

7. The computer-implemented method of claim 6, further comprising:

receiving additional order data from an order generation system; and generating additional instructions for (i) grouping additional items represented in the additional order data into item units, (ii) moving the item units through the warehouse, and (iii) packing the item units into containers for delivery to the location.

8. The computer-implemented method of claim 7, further comprising providing the additional generated instructions for presentation on a display of a computing device.

9. A computer system for generating instructions for performing warehousing operations for fulfilling orders, the system comprising:

one or more data processing apparatuses including one or more processors, memory, and storage devices storing instructions that, when executed, cause the one or more processors to perform operations comprising:

receiving, by the computer system, order data that represents a plurality of ordered items for delivery to a location;

selecting, by the computer system, from a data store of first policies, a selected first policy, each first policy in the data store of first policies including different rules for grouping items represented in the order data into item units;

transforming, by the computer system, at least a portion of the order data into first output data that includes item unit data that defines a plurality of item units in which items represented in the order data have been grouped, comprising (i) receiving, first parameter values that correspond to parameters accepted by the selected first policy, (ii) generating the first output data, based on rules associated with the selected first policy and according to the first parameter values, and (iii) adding, to a data pool that is maintained for use by multiple different downstream policies, the first output data that includes the item unit data, wherein each item unit datum in the item unit data represents a grouping of items represented in the order data according to an execution of the rules of the selected first policy using the first parameter values;

selecting, by the computer system, from a data store of second policies, a selected second policy, each second policy in the data store of second policies including different rules for performing initial operations on an item unit for moving the item unit through a warehouse;

annotating, by the computer system, the item unit data, comprising (i) receiving, from the data pool to which the first output data has been added, second parameter values that correspond to parameters accepted by the selected second policy, (ii) for each item unit, based on rules associated with the selected second policy and according to the second parameter values, modifying an item unit datum that represents the item unit to include annotated information that corresponds to the initial operations to be performed on the item unit for moving the item unit through the warehouse, and (iii) adding, to the data pool, second output data that includes the annotated item unit data, wherein each annotated item unit datum in the item unit data represents a grouping of items represented in the order data that is to be moved through the warehouse according to an execution of the rules of the selected second policy using the second parameter values;

selecting, by the computer system, from a data store of third policies, a selected third policy, each third policy in the data store of third policies including different rules for performing subsequent operations on the item unit for packing the item unit into a container;

annotating, by the computer system, the item unit data, comprising (i) receiving, from the data pool to which the first output data and the second output data has been added, third parameter values that correspond to parameters accepted by the selected third policy, and (ii) for each item unit, based on rules associated with the selected third policy and according to the third parameter values, modifying the item unit datum that represents the item unit to include annotated information that corresponds to the subsequent operations to be performed on the item unit, wherein each annotated item datum in the item unit data represents a grouping of items represented in the order data that is to be packed into a container according to an execution of the rules of the selected third policy using the third parameter values;

generating, by the computer system, instructions for (i) grouping items represented in the order data into item units, based on the item unit data that defines the plurality of item units per the selected first policy, (ii) moving the item units through the warehouse, based on the annotated information that corresponds to the initial operations to be performed on the item units per the selected second policy, and (iii) packing the item units into containers for delivery to the location, based on the annotated information that corresponds to the subsequent operations to be performed on the item units per the selected third policy;

performing an automated simulation using the generated instructions for (i) grouping items represented in the order data into item units, (ii) moving the items units through the warehouse, and (iii) packing the item units into containers for delivery to the location;

determining simulation results for the automated simulation;

evaluating the simulation results based on one or more metrics; and modifying one or more of the selected first policy, the selected second policy, and the selected third policy, based on evaluating the simulation results, wherein selecting the selected second policy and the selected third policy is based on selection rules that (i) specify policies based on the order data, and (ii) define combinations of first, second, and third policies, wherein the combinations are defined based at least in part on a comparison of simulation results of previously performed simulations of warehousing operations for fulfilling orders.

10. The computer system of claim 9, wherein the execution of the rules of the selected first policy is performed using only a portion of data from the data pool as the first parameter values.

11. The computer system of claim 10, wherein at least two of the first policies in the data store of first policies accept different parameters.

12. The computer system of claim 9, wherein the generated instructions for (i) grouping items represented in the order data into item units, (ii) moving the items units through the warehouse, and (iii) packing the item units into containers for delivery to the location are executable by or more servers that are configured to perform a simulation of performing the warehousing operations.

13. A non-transitory computer-readable storage medium coupled to one or more processors for generating instructions for performing warehousing operations for fulfilling orders, and having instructions stored thereon which, when executed by the one or more processors, cause the one or more processors to perform operations comprising:

receiving, by a computer system, order data that represents a plurality of ordered items for delivery to a location;

selecting, by the computer system, from a data store of first policies, a selected first policy, each first policy in the data store of first policies including different rules for grouping items represented in the order data into item units;

transforming, by the computer system, at least a portion of the order data into first output data that includes item unit data that defines a plurality of item units in which items represented in the order data have been grouped, comprising (i) receiving first parameter values that correspond to parameters accepted by the selected first policy, (ii) generating the first output data, based on rules associated with the selected first policy and according to the first parameter values, and (iii) adding, to a data pool that is maintained for use by multiple different downstream policies, the first output data that includes the item unit data, wherein each item unit datum in the item unit data represents a grouping of items represented in the order data according to an execution of the rules of the selected first policy using the first parameter values;

selecting, by the computer system, from a data store of second policies, a selected second policy, each second policy in the data store of second policies including different rules for performing initial operations on an item unit for moving the item unit through a warehouse;

annotating, by the computer system, the item unit data, comprising (i) receiving, from the data pool to which the first output data has been added, second parameter values that correspond to parameters accepted by the selected second policy, (ii) for each item unit, based on rules associated with the selected second policy and according to the second parameter values, modifying an item unit datum that represents the item unit to include annotated information that corresponds to the initial operations to be performed on the item unit for moving the item unit through the warehouse, and (iii) adding, to the data pool, second output data that includes the annotated item unit data, wherein each annotated item unit datum in the item unit data represents a grouping of items represented in the order data that is to be moved through the warehouse according to an execution of the rules of the selected second policy using the second parameter values;

selecting, by the computer system, from a data store of third policies, a selected third policy, each third policy in the data store of third policies including different rules for performing subsequent operations on the item unit for packing the item unit into a container;

annotating, by the computer system, the item unit data, comprising (i) receiving, from the data pool to which the first output data and the second output data has been added, third parameter values that correspond to parameters accepted by the selected third policy, and (ii) for each item unit, based on rules associated with the selected third policy and according to the third parameter values, modifying the item unit datum that represents the item unit to include annotated information that corresponds to the subsequent operations to be performed on the item unit, wherein each annotated item datum in the item unit data represents a grouping of items represented in the order data that is to be packed into a container according to an execution of the rules of the selected third policy using the third parameter values;

generating, by the computer system, instructions for (i) grouping items represented in the order data into item units, based on the item unit data that defines the plurality of item units per the selected first policy, (ii) moving the item units through the warehouse, based on the annotated information that corresponds to the initial operations to be performed on the item units per the selected second policy, and (iii) packing the item units into containers for delivery to the location, based on the annotated information that corresponds to the subsequent operations to be performed on the item units per the selected third policy;

performing an automated simulation using the generated instructions for (i) grouping items represented in the order data into item units, (ii) moving the items units through the warehouse, and (iii) packing the item units into containers for delivery to the location;

determining simulation results for the automated simulation;

evaluating the simulation results based on one or more metrics; and modifying one or more of the selected first policy, the selected second policy, and the selected third policy, based on evaluating the simulation results, wherein selecting the selected second policy and the selected third policy is based on selection rules that (i) specify policies based on the order data, and (ii) define combinations of first, second, and third policies, wherein the combinations are defined based at least in part on a comparison of simulation results of previously performed simulations of warehousing operations for fulfilling orders.

14. The non-transitory computer-readable storage medium of claim 13, wherein the execution of the rules of the selected first policy is performed using only a portion of data from the data pool as the first parameter values.

15. The non-transitory computer-readable storage medium of claim 14, wherein at least two of the first policies in the data store of first policies accept different parameters.

16. The non-transitory computer-readable storage medium of claim 13, wherein the generated instructions for (i) grouping items represented in the order data into item units, (ii) moving the items units through the warehouse, and (iii) packing the item units into containers for delivery to the location are executable by one or more servers that are configured to perform a simulation of performing the warehousing operations.

* * * * *